United States Patent
Rouse et al.

(10) Patent No.: US 7,284,420 B2
(45) Date of Patent: Oct. 23, 2007

(54) AIR DATA SYSTEM AND METHOD FOR ROTARY AIRCRAFT

(75) Inventors: Gordon F. Rouse, Arden Hills, MN (US); Michael R. Elgersma, Plymouth, MN (US); Steven H. Thomas, Brooklyn Center, MN (US)

(73) Assignee: Honeywell International Inc., Morristown, NJ (US)

( * ) Notice: Subject to any disclaimer, the term of this patent is extended or adjusted under 35 U.S.C. 154(b) by 295 days.

(21) Appl. No.: 10/889,877

(22) Filed: Jul. 13, 2004

(65) Prior Publication Data

US 2006/0027702 A1 Feb. 9, 2006

(51) Int. Cl.
 *G01P 13/00* (2006.01)
(52) U.S. Cl. .................... 73/170.02; 73/180
(58) Field of Classification Search ........... 73/170.02, 73/170.14, 180
 See application file for complete search history.

(56) References Cited

U.S. PATENT DOCUMENTS

| | | | |
|---|---|---|---|
| 2,952,154 A | 9/1960 | Traksel | 73/182 |
| 3,070,999 A | 1/1963 | Garbell | 73/181 |
| 3,332,282 A | 7/1967 | Daw | 73/182 |
| 4,038,870 A | 8/1977 | Rotier | 73/181 |
| 4,303,978 A * | 12/1981 | Shaw et al. | 701/220 |
| 5,265,827 A | 11/1993 | Gerhardt | 244/20 |
| 5,279,155 A | 1/1994 | Johnson et al. | 73/202.5 |
| 5,585,557 A * | 12/1996 | Loschke et al. | 73/170.14 |

(Continued)

FOREIGN PATENT DOCUMENTS

EP 0 321 876 B1 6/1993

(Continued)

OTHER PUBLICATIONS

Patent Abstrats of Japan, vol. 016, No. 568 (p. 1458), Dec. 9, 1992 & JP 04 218778 A (Shimadzu Corp), Aug. 10, 1992 abstract; figures 1, 5, 6.

*Primary Examiner*—Andre J. Allen
(74) *Attorney, Agent, or Firm*—McDonnell Boehnen Hulbert & Berghoff LLP

(57) ABSTRACT

An air data system and method for a rotary aircraft is described. The air data system includes a plurality of flush ports connected via tubing to a plurality of air flow sensors that can measure air flow speeds as low as approximately 0.02 knots. The flush ports are arranged around a main rotor shaft and below a rotor hub of the rotary aircraft to help reduce the impact of rotor downwash. The flush ports and tubing permit air to flow into the air flow sensors, which allows the plurality of air flow sensors to measure speed and direction of cross-wind components of air flow surrounding the rotary aircraft.

24 Claims, 5 Drawing Sheets

U.S. PATENT DOCUMENTS

| | | | |
|---|---|---|---|
| 5,616,861 A * | 4/1997 | Hagen | 73/180 |
| 5,750,891 A * | 5/1998 | Brocklehurst | 73/178 H |
| 5,811,691 A | 9/1998 | Jackson | 73/861.65 |
| 5,866,813 A | 2/1999 | Nakaya et al. | 73/147 |
| 5,874,673 A * | 2/1999 | Greene | 73/178 H |
| 6,043,759 A | 3/2000 | Paterson et al. | 340/970 |
| 6,084,542 A * | 7/2000 | Wright et al. | 342/357.13 |
| 6,101,429 A | 8/2000 | Sarma et al. | 701/7 |
| 6,184,773 B1 | 2/2001 | Bonne et al. | 338/25 |
| 6,216,064 B1 | 4/2001 | Johnson et al. | 701/4 |
| 6,259,379 B1 | 7/2001 | Paterson et al. | 340/970 |
| 6,419,186 B1 | 7/2002 | Bachinski et al. | 244/17.11 |
| 6,452,542 B1 * | 9/2002 | Bachinski et al. | 342/357.06 |
| 6,481,222 B1 | 11/2002 | Denniston | 62/94 |
| 6,604,029 B2 * | 8/2003 | Cronin et al. | 701/6 |
| 6,672,152 B2 | 1/2004 | Rouse et al. | 73/170.02 |
| 2002/0122001 A1 * | 9/2002 | Bachinski et al. | 342/357.06 |
| 2002/0169525 A1 * | 11/2002 | Cronin et al. | 701/6 |
| 2003/0043364 A1 | 3/2003 | Jamieson et al. | 356/28.5 |
| 2003/0126923 A1 * | 7/2003 | Schulze | 73/170.14 |

FOREIGN PATENT DOCUMENTS

| | | |
|---|---|---|
| EP | 0 763 743 A | 3/1997 |
| EP | 0 778 951 B1 | 8/2001 |
| EP | 1 268 275 A1 | 1/2003 |
| GB | 2312408 A | 10/1997 |
| JP | 4 218778 | 8/1992 |
| WO | WO 01/74663 A1 | 10/2001 |

* cited by examiner

AIR DATA SYSTEM AND METHOD FOR ROTARY AIRCRAFT

FIELD

The present invention relates generally to rotary aircrafts, and more particularly, relates to an air data system and method for rotary aircraft.

BACKGROUND

It is difficult to measure air data (e.g., wind speed, Angle of Attack (AOA), and Angle of Sideslip (AOS)) on a rotary aircraft, such as a helicopter. This difficulty is due in part to the air speed of rotary aircraft. The air speed of the rotary aircraft can be much slower than a typical fixed-wing aircraft. In fact, rotary aircraft have the ability to hover allowing the air speed of a rotary aircraft to approach zero. These low air speeds make it difficult to measure air data as some air data sensors are not sensitive enough at low speeds to obtain reliable air data.

Air data sensors typically use pressure sensors to make air data measurements. Pressure sensors may be used to measure air flow as pressure is proportional to velocity. However, some air data sensors use temperature sensors to measure air flow using the theory of heat transfer.

Another difficulty in measuring air data is a result of rotor downwash, which may be described as the air flow disruptions caused by a main rotor (the rotary aircraft's rotating wing assembly) of a rotary aircraft. Rotor downwash makes obtaining cross-wind components of the air flow difficult. To avoid the rotor downwash problem, air data sensors have been placed to avoid rotor downwash. For example, air data sensors have been attached to rotor blades on the main rotor. However, this type air data system requires a rotor angle encoder, which adds complexity to the system. Further, air data sensors that have been attached to the rotor blades are placed in a harsh environment, which may cause reliability problems.

Air data sensors have also been placed in chambers to overcome the problems associated with rotor downwash. However, once the air flow enters the chamber it is difficult to separate the air flow into distinct x, y, z components (i.e., air flow traveling in different directions). As a result, it is difficult to measure the speed and direction of the cross-wind components of the air flow using this type of air data system.

Accordingly, it would be beneficial to have an air data system and method that can reliably measure air data, including the cross-wind components of the air flow, for rotary aircraft.

SUMMARY

An air data system and method for rotary aircraft is described. The air data system includes a plurality of ports connected to a plurality of air flow sensors. In a preferred embodiment, the ports are flush ports and the air flow sensors are high-sensitivity mass air flow sensors. The high-sensitivity mass air flow sensors can measure air flow speeds as low as approximately 0.02 knots.

The ports are arranged around a main rotor shaft and below a rotor hub of the rotary aircraft. The ports are preferably integrated into a cowling of the rotary aircraft to be flush with an outer surface of the cowling. Each port is oriented such that they have air flow projections in the x, y, and z axis of the rotary aircraft. As a result, both AOA and AOS can be measured. Rotor downwash is reduced at the rotor hub, thus, the placement of the ports beneath the rotor hub helps reduce the problems associated with downwash.

The air flow sensors may be connected to the ports via tubing. Preferably, one air flow sensor is connected to two ports. The two ports that share an air flow sensor are located on opposite sides of the cowling. The air flow sensors and tubing are located within the cowling. The ports and tubing permit air to flow into the plurality of air flow sensors, which allows the plurality of air flow sensors to measure the speed and direction of the cross-wind components of the air flow surrounding the rotary aircraft.

By using multiple ports arranged around the main rotor shaft and by using high-sensitivity mass air flow sensors, reliable air data may be collected for the rotary aircraft even at low air speeds. These as well as other aspects and advantages will become apparent to those of ordinary skill in the art by reading the following detailed description, with reference where appropriate to the accompanying drawings.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
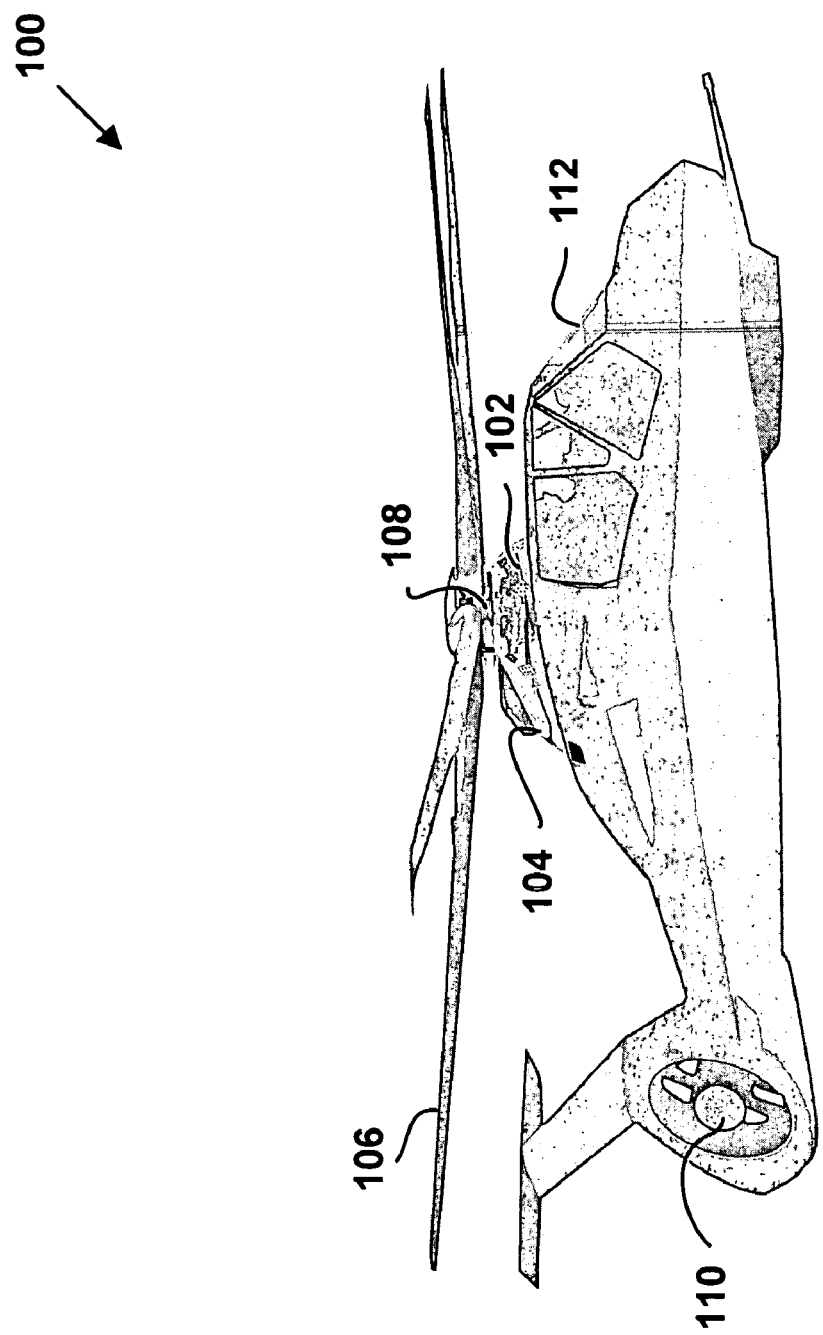
FIG. 1 is a pictorial representation of a rotary aircraft including an air data system, according to an embodiment.

FIG. 1 is a pictorial representation of a rotary aircraft 100 including an air data system 102. The rotary aircraft 100 may also include a cowling 104, a main rotor 106, a main rotor shaft 108, a tail rotor 110, and a cockpit 112. The rotary aircraft 100 may include additional components, such as a swash plate and control rods. FIG. 1 depicts the rotary aircraft 100 as a helicopter; however, the air data system 102 may be used on other rotorcraft, such as the V-22 Osprey. Further, the air data system 102 may be used in other applications in which air flow parameters need to be measured.

The air data system 102 may be integrated into the cowling 104 of the rotary aircraft 100. The cowling 104 is a cover enclosing part or all of the rotary aircraft's transmission. The cowling 104 is typically composed of metal and is used to protect the transmission from environmental factors, such as weather, birds, and debris. Further, the cowling 104 may be used to make the rotary aircraft 100 more aerodynamic.

Figure 2:
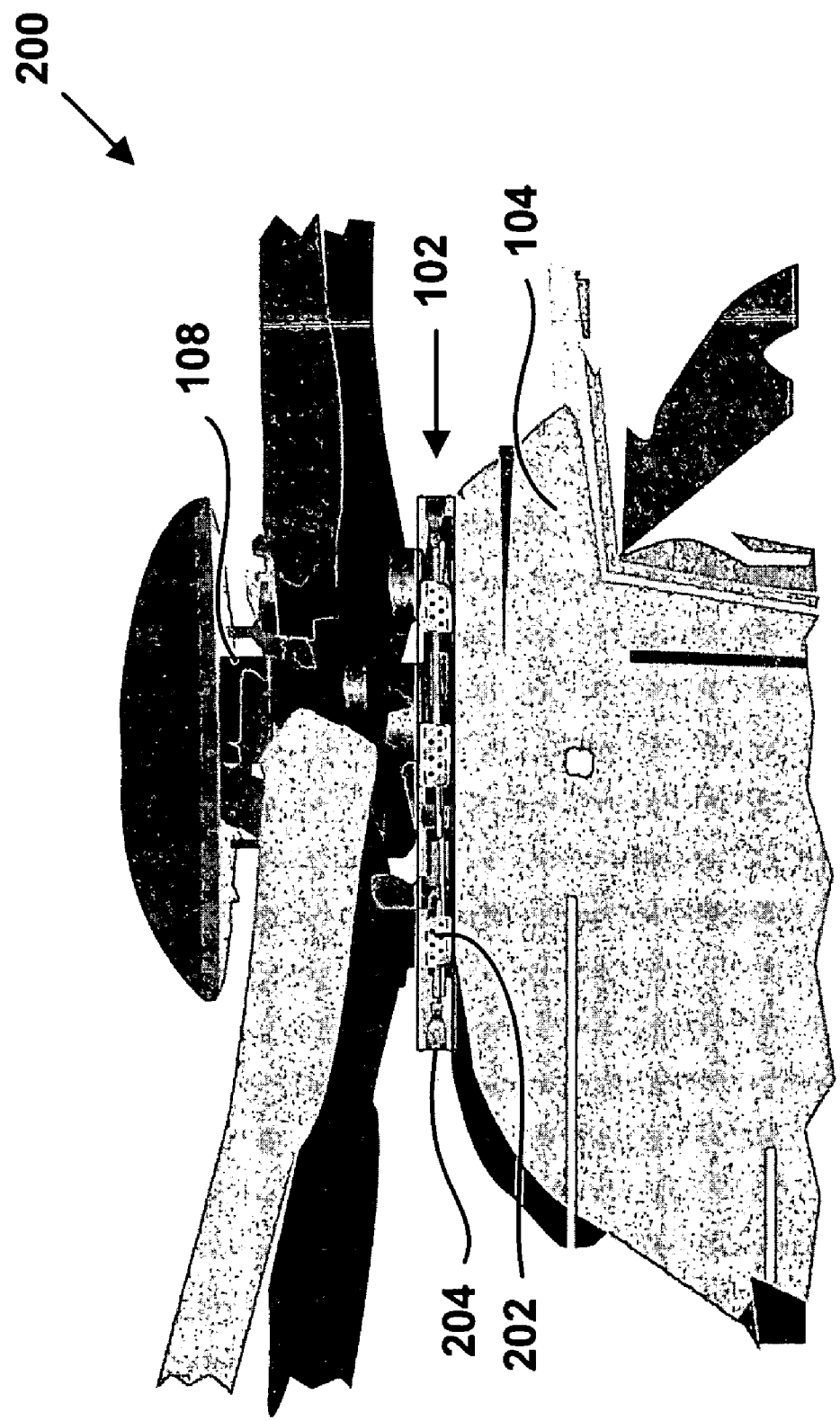
FIG. 2 is a side view of a section of the rotary aircraft depicted in FIG. 1, according to an embodiment.

The location of the air data system 102 may be more clearly seen in FIG. 2, which depicts a side view of a section 200 of the rotary aircraft 100 depicted in FIG. 1. The air data system 102 may allow the air flow to enter through flush ports 202 located in a collar 204 encircling the cowling 104. While one collar 204 is depicted in FIG. 2, more than one collar 204 may be integrated into the cowling 104. For example, a first collar 204 may be located above a second collar 204. By vertically stacking collars 204 in the cowling 104, a differential pressure profile may be obtained in a vertical axis, which may be used for obtaining AOA data.

Alternatively, the flush ports 202 may be mounted directly into the cowling 104. The flush ports 202 may be mounted into the cowling 104 in one or more horizontal layers as described above with respect to the one or more collars 204. For example, the flush ports 202 may be attached using screws as described in U.S. Pat. No. 6,672,152, which is assigned to the same assignee as the present invention and is incorporated in its entirety. However, other mounting methods may be used.

Each flush port 202 may be integrated into the cowling 104 (either within a collar or individually) so that the flush port 202 is approximately even with an outer surface of the cowling 104. For example, the flush port 202 may be even with the outer surface of the cowling 102 within a tolerance of thousands of an inch (i.e., tolerance <0.01 inch). By having a port that is flush with the outer surface of the cowling 104, air flow turbulence may be minimized. Additionally, ports that are flush with the outer surface of the cowling 104 may be needed in stealth applications to minimize the possibility that radar signals may be reflected back off surface imperfections caused by ports that are not flush with the outer surface of the cowling 104.

The flush ports 202 may be spaced such that each flush port is approximately equidistant from adjacent flush ports. Further, the flush ports may be oriented such that they have air flow projections in the x, y, and z axis of the rotary aircraft 100. This spacing may be designed to obtain air data regarding various cross-wind components of the air flow. As a result, both AOA and AOS may be measured.

Each flush port 202 may include a plurality of holes, which allow air to enter tubing connected to the flush port 202 located within the cowling 104. The flush ports 202 and the collar 204 may be more clearly seen in FIG. 3.

Figure 3:
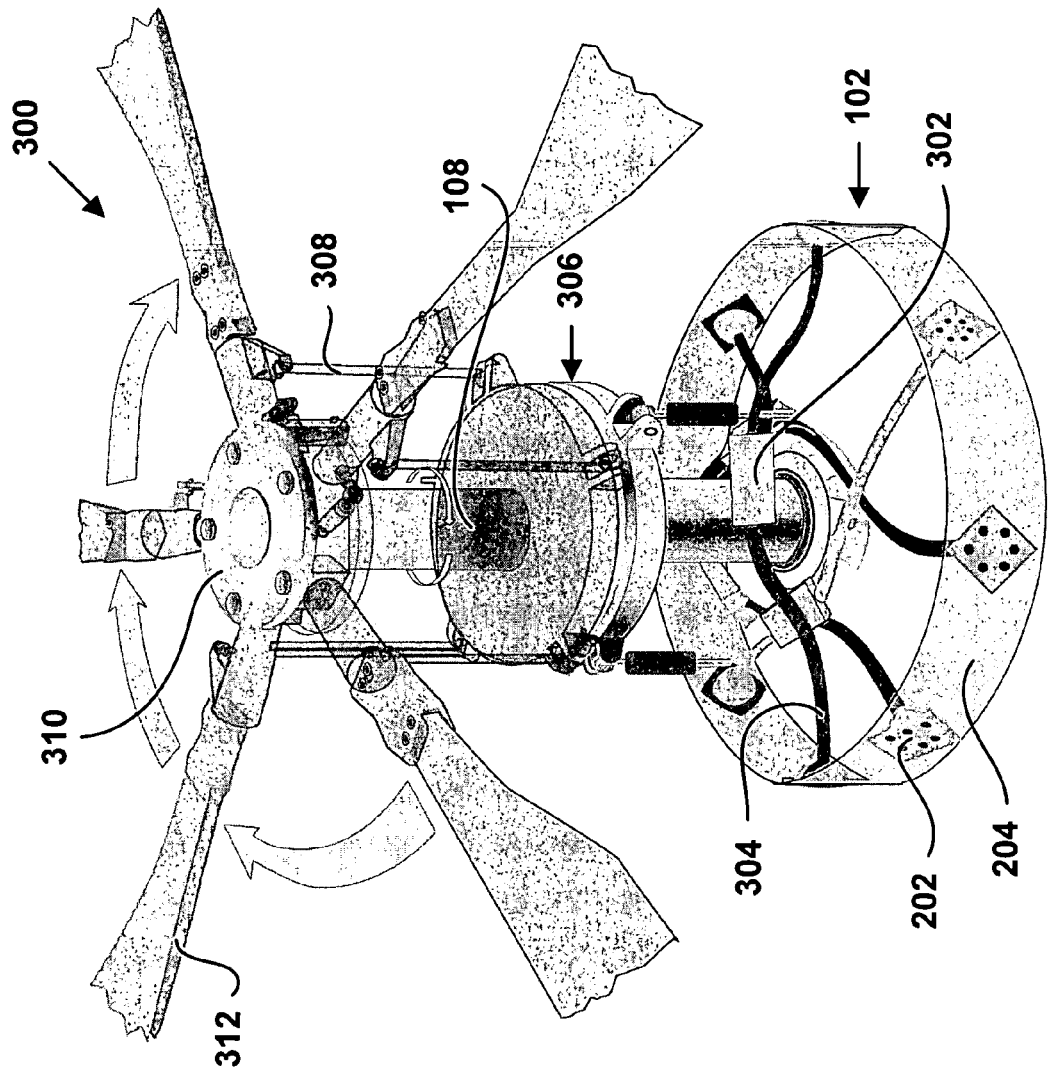
FIG. 3 is a side view of an air data system in relationship to a main rotor shaft in the rotary aircraft depicted in FIG. 1, according to an embodiment.

FIG. 3 is a side view 300 of an air data system 102 shown in relationship to the main rotor shaft 108 in the rotary aircraft 100. The cowling 104 has been removed from FIG. 3 to show other components of the rotary aircraft 100 located within the cowling 104.

As seen in FIG. 3, the flush ports 202 are arranged around the main rotor shaft 108 and below a rotor hub 310 of the rotary aircraft 100. While the flush ports 202 are shown in a circular array in FIG. 3, it is understood that the flush ports 202 may be located in an array that is not circular, such as an elliptical array or an array having a symmetrical shape. The shape of the array may depend on the shape of the cowling 104.

The flush ports 202 may be attached to air data sensors 302 via tubing 304. The flush ports 202 may allow air flow to enter into the tubing 304, which directs the air flow past the air data sensors 302.

The air data sensors 302 may include a flow sensor. The flow sensor may be a high-sensitivity mass air flow sensor capable of detecting small pressure, temperature, and/or other changes which may be measured and converted to air flow data. For example, the flow sensor may measure air flow speeds of up to five orders of magnitude, from approximately 0.02 knots to approximately 1000 knots. However, the air data system 102 may be limited to the flow sensor measuring air flow speeds up to the speed of sound (i.e., approximately 661 knots at sea level).

Additionally, the flow sensor may be small, which may limit the volume of air necessary to achieve this range of measurements. The air flow sensor may be constructed as described in U.S. Pat. No. 6,184,773, which is assigned to the same assignee as the present invention and is incorporated in its entirety. However, other air data sensor construction may be used.

The air data sensors 302 may include additional components, such as a processor and a power supply. The processor may be used to convert measurements obtained by the flow sensor, such as pressure and/or temperature measurements, into wind speed, AOA, and AOS data. Alternatively, the air data sensors 302 may be connected to a single processor that may analyze data received from the air data sensors 302. The processor may be connected to one or more avionic systems, which may provide the air data to a pilot via a display in the cockpit of the rotary aircraft 100, to an aircraft flight control, and/or to a flight management system.

The tubing 304 may be aluminum, stainless steel, or other appropriate material. For example, the tubing may be defined by United States Air Force Specification MIL-P-26292C, paragraph 3.3.6.1 (i.e., aluminum tubing: 5052, drawn, seamless, 0.25-inch outer diameter, 0.035-inch side wall thickness; stainless steel tubing: 0.25-inch outer diameter, 0.020-inch side wall thickness). The stainless steel tubing may be used in high-temperature applications, such as when the tubing is placed above an engine of the rotary aircraft 100, while the aluminum tubing may be used in applications in which the tubing is not exposed to high temperatures. However, other tubing materials and sizes may be used based on the application of the air data system 102.

A pilot located in the cockpit 112 may operate the rotary aircraft 100 by controlling the main rotor 106 and the tail rotor 110. The main rotor 106 is connected to the main rotor shaft 108 at the rotor hub 310. The pilot maneuvers the rotary aircraft 100 by controlling a swash plate assembly 306 attached to the main rotor shaft 108. The swash plate assembly 306 adjusts control rods 308 attached to the blades 312 of the main rotor 106. The control rods 308 adjust the angle of the blades 312 to control the direction and the altitude of the rotary aircraft 100.

The air data sensors 302 may be positioned below the rotor hub 310. Rotor downwash is reduced at the rotor hub 310, so this placement of the air data sensors 302 may help reduce the problems associated with downwash. Further, the air data sensors 302 and tubing 304 may be located below the swash plate assembly 306 and the control rods 308 to prevent interference with the control of the rotary aircraft 100.

Figure 4:
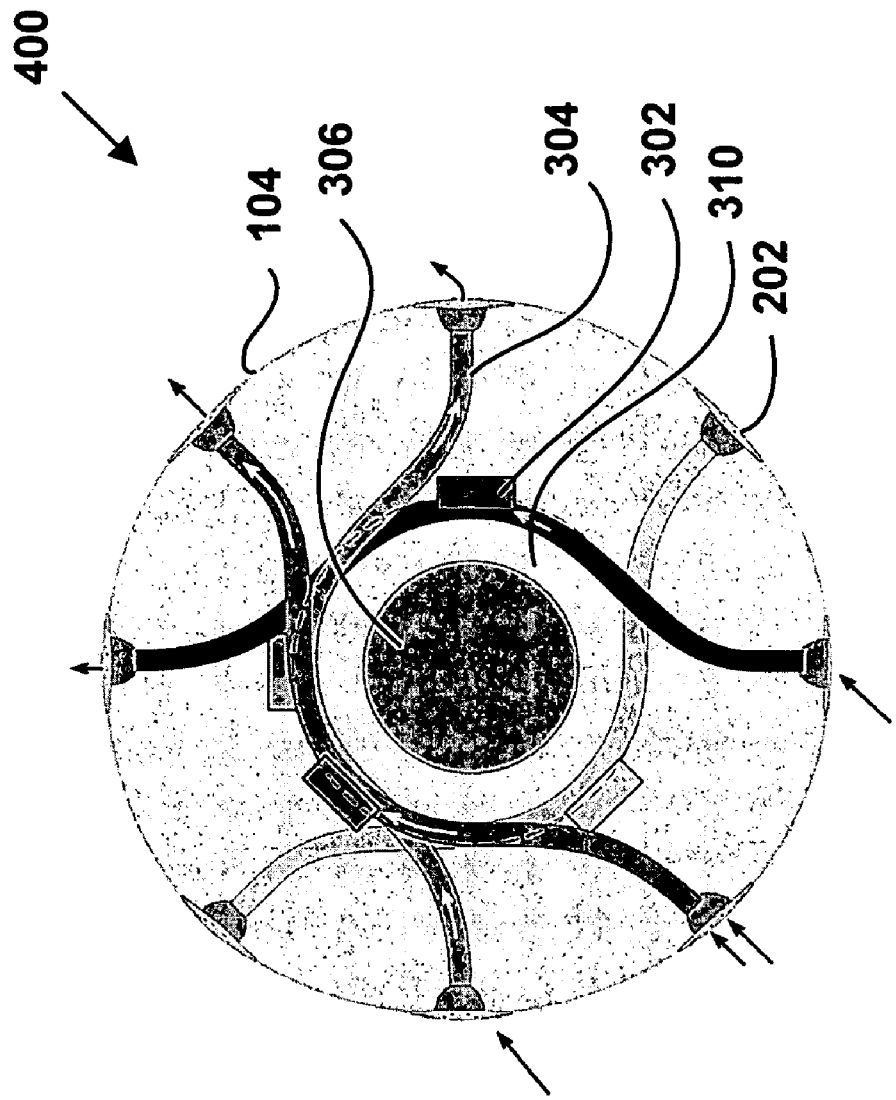
FIG. 4 is a top view of the air data system depicted in FIG. 3, according to an embodiment.

FIG. 4 is a top view 400 of the air data system 102 depicted in FIG. 3. The air data system 102 includes eight flush ports 202 connected to four air data sensors 302 via tubing 304. Two flush ports 202 may be connected to a single air data sensor 302. The two flush ports 202 connected to the same air data sensor 302 may be located on opposite sides of the cowling 104. In this arrangement, air flow may travel through the tubing 304 from one side of the cowling 104 to the other. As the air flow travels through the tubing 304, the air data sensor 302 measures changes caused by the air flow, and converts the measurements to air data that can be used by avionics on the rotary aircraft 100 to provide data to the pilot. The pilot may then use the air data to control and navigate the rotary aircraft 100.

While eight flush ports 202 and four air data sensors 302 may be used in a preferred embodiment, different numbers of ports and sensors may be used. For example, a rotary aircraft 100 having a large diameter cowling 104 may include ten flush ports 202 connected to five air data sensors 302 via tubing 304, which may allow data from more air flow components to be obtained. At least six flush ports 202 may be used to measure three dimensional flow measurements (i.e., two ports per each axis (x, y, z)).

Additionally, more than two flush ports 202 may be connected to a single air data sensor 302. For example, two sets of four flush ports 202 connected to a single air data sensor 302 may be used. The flush ports 202 in the first set may be alternated with the flush ports 202 in the second set in the cowling 104. Other combinations of flush ports 202 and air data sensors 302 may also be used.

Figure 5:
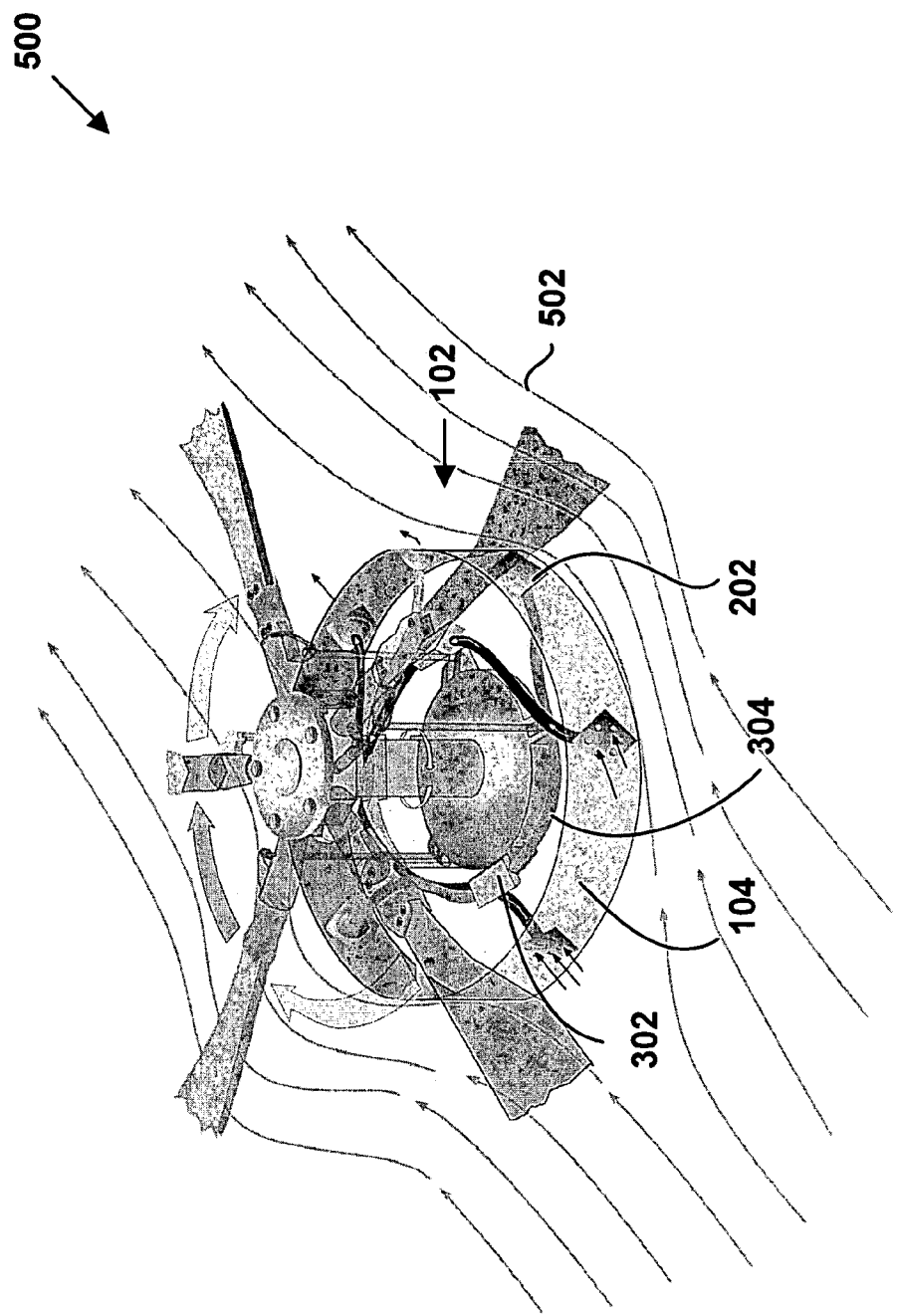
FIG. 5 is a pictorial representation of air flow surrounding the air data system depicted in FIG. 3, according to an embodiment.

FIG. 5 is a pictorial representation 500 of air flow 502 surrounding the air data system 102 depicted in FIG. 3. The air flow 502 is depicted as traveling from the bottom, left-hand side of the page to the top, right-hand side of the page. Of course the air flow 502 may travel in many directions with respect to the rotary aircraft 100.

The air flow 502 enters the flush ports 202 facing the direction of the air flow and exits through flush ports 202 on the opposite side of the cowling 104. As a result, cross-wind components of the air flow enter different flush ports 202. The velocity of the different air flow components may be different. The air flow 502 travels through the tubing 304 and causing changes, which are detected by the air data sensors 302. The air data sensors 302 measure the changes and convert the measurements into air data. By using multiple ports arranged around the main rotor shaft and beneath the rotor hub, and by using high-sensitivity mass air flow sensors, reliable air data may be collected for a rotary aircraft even at low air speeds.

It should be understood that the illustrated embodiments are exemplary only and should not be taken as limiting the scope of the present invention. The claims should not be read as limited to the described order or elements unless stated to that effect. Therefore, all embodiments that come within the scope and spirit of the following claims and equivalents thereto are claimed as the invention.

We claim:

1. An air data system for a rotary aircraft, comprising in combination:
a plurality of ports arranged around a main rotor shaft and beneath a rotor hub of the rotary aircraft; and
a plurality of air flow sensors connected to the plurality of ports, wherein the plurality of ports permit air to flow into the plurality of air flow sensors, and wherein the plurality of air flow sensors are operable to measure speed and direction of cross-wind components of air flow surrounding the rotary aircraft based on the air that flows through the plurality of ports.

2. The system of claim 1, wherein the plurality of ports are flush ports.

3. The system of claim 1, wherein the plurality of ports is arranged such that x, y, and z air flow projections are measured.

4. The system of claim 3, wherein a port in the plurality of ports is positioned at a substantially equal distance from an adjacent port.

5. The system of claim 1, wherein the plurality of ports includes at least six ports.

6. The system of claim 1, wherein the plurality of ports are integrated into a cowling of the rotary aircraft.

7. The system of claim 1, wherein the plurality of ports are located within a collar.

8. The system of claim 7, wherein the collar is integrated into a cowling of the rotary aircraft.

9. The system of claim 1, wherein the plurality of ports is connected to the plurality of air flow sensors via tubing.

10. The system of claim 1, wherein each air flow sensor in the plurality of air flow sensors is connected to two ports in the plurality of ports.

11. The system of claim 1, wherein each air flow sensor in the plurality of air flow sensors is operable to detect air flow speeds as low as approximately 0.02 knots.

12. The system of claim 1, wherein the plurality of air flow sensors includes four air flow sensors.

13. An air data system for a rotary aircraft, comprising in combination:
a plurality of flush parts arranged around a main rotor shaft and below a rotor hub of the rotary aircraft, wherein the plurality of flush ports is integrated into a cowling of the rotary aircraft; and
a plurality of air flow sensors operable to detect air flow speeds as low as approximately 0.02 knots, wherein each air flow sensor is connected to two flush ports via tubing, wherein the plurality of flush ports and the tubing permit air to flow into the plurality of air flow sensors, and wherein the plurality of air flow sensors are operable to measure speed and direction of cross-wind components of air flow surrounding the rotary aircraft based on the air that flows through the flush ports.

14. A method of measuring air data for a rotary aircraft, comprising in combination:
integrating a plurality of ports into a cowling of the rotary aircraft, wherein the cowling is located around a main rotor shaft and beneath a rotor hub of the rotary aircraft; and
connecting the plurality of ports to a plurality of air flow sensors, wherein the air flow sensors are located within the cowling, wherein the plurality of ports permit air to flow into the plurality of air flow sensors, and wherein the plurality of air flow sensors are operable to measure speed and direction of cross-wind components of air flow surrounding the rotary aircraft based on the air that flows through the ports.

15. The method of claim 14, wherein the step of integrating the plurality of ports into the cowling includes fastening each port of the plurality of ports individually into the cowling.

16. The method of claim 14, wherein the step of integrating the plurality of ports into a cowling includes integrating a collar having the plurality of ports into the cowling.

17. The method of claim 14, wherein integrating the plurality of ports into a cowling includes positioning the plurality of ports such that x, y, and z air flow projections are measured.

18. The method of claim 17, wherein the positioning of the plurality of ports includes positioning a port in the plurality of ports at a substantially equal distance from an adjacent port.

19. The method of claim 14, wherein The plurality of ports are flush ports.

20. The method of claim 14, wherein the plurality of ports includes at least six ports.

21. The method of claim 14, wherein the step of connecting the plurality of air flow sensors to the plurality of air flow sensors includes connecting the plurality of air flow sensors to the plurality of air flow sensors via tubing.

22. The method of claim 14, wherein the step of connecting the plurality of ports to a plurality of air flow sensors includes connecting each air flow sensor in the plurality of air flow sensors to two ports in the plurality of ports.

23. The method of claim 14, wherein each of air flow sensor in the plurality of air flow sensors is operable to detect air flow speeds as low as approximately 0.02 knots.

24. The method of claim 14, wherein the plurality of air flow sensors includes four air flow sensors.

\* \* \* \* \*